United States Patent [19]

Seward

[11] Patent Number: 5,773,919
[45] Date of Patent: *Jun. 30, 1998

[54] ELECTRON SPIRAL TOROID

[75] Inventor: D. Clint Seward, Acton, Mass.

[73] Assignee: Electron Power Systems, Acton, Mass.

[*] Notice: The term of this patent shall not extend beyond the expiration date of Pat. No. 5,175,166.

[21] Appl. No.: 455,221

[22] Filed: May 31, 1995

Related U.S. Application Data

[63] Continuation-in-part of Ser. No. 996,752, Dec. 24, 1992, which is a continuation-in-part of Ser. No. 841,308, Feb. 24, 1992, Pat. No. 5,175,466, which is a continuation of Ser. No. 529,783, May 25, 1990, abandoned, which is a continuation of Ser. No. 214,904, Jun. 28, 1988, abandoned, which is a continuation of Ser. No. 914,629, Oct. 2, 1986, abandoned.

[51] Int. Cl.$^6$ .............. H01J 17/26; H01J 61/28; H05H 13/00; H05H 11/00
[52] U.S. Cl. ............. 313/231.31; 313/62; 315/502; 315/504
[58] Field of Search ............. 313/62, 231.31; 315/502, 504; 376/126, 127, 128, 129, 133, 137, 139

[56] References Cited

U.S. PATENT DOCUMENTS

| | | | |
|---|---|---|---|
| 2,233,779 | 3/1941 | Fritz | 250/36 |
| 2,993,851 | 7/1961 | Thomson et al. | 204/193.2 |
| 3,029,199 | 4/1962 | Baker et al. | 204/193.2 |
| 3,113,088 | 12/1963 | Josephson | 204/193.2 |
| 3,141,826 | 7/1964 | Friedrichs et al. | 176/7 |
| 3,155,594 | 11/1964 | Lehnert et al. | 176/8 |
| 3,255,404 | 6/1966 | Kidwell | 323/44 |
| 3,626,305 | 12/1971 | Furth et al. | 328/233 |
| 4,555,666 | 11/1985 | Martin | 326/233 |
| 5,175,466 | 12/1992 | Seward | 313/231.31 |

FOREIGN PATENT DOCUMENTS

| | | |
|---|---|---|
| 925157 | 4/1973 | Canada. |
| 1157971 | 9/1985 | U.S.S.R. . |

OTHER PUBLICATIONS

Chen, K.W., et al., "Compact toroidal energy storage device using a relativistically electron cloud densified by travelling magnetic waves (TMW)," *Digest of Technical Papers of the 4th IEEE Pulsed Power Conference*, pp. 518–521 (1983, Jun.).

Ono, M., et al., "Reflection at a metal surface in a magnetically controlled beam plasma discharge," *1989 International Conference on Plasma Physics, New Delhi, India*, 3:997–1000 (1989).

Gilbert, S.L., et al., "Shell–Structure phase of magnetically confined strongly coupled plasmas," *Physical Review Letters*, 60(20):2022–2025, (16 May 1988).

Radin et al., "Physics for Scientists and Engineers," (Prentice-Hall 1982), pp. 559–560.

Malmberg, J.H., et al., "Pure Electron Plasma, Liquid, and Crystal," *Physical Review Letters*, 39(21):1333–1336, (21 Nov. 1977).

Hangst, J.S., et al., "Anomalous Schottky Signals from a Laser–Cooled Ion Beam," *Physical Review Letters*, 74(1):86–89, (2 Jan. 1995).

*Primary Examiner*—Sandra L. O'Shea
*Assistant Examiner*—Mack Haynes
*Attorney, Agent, or Firm*—Hamilton, Brook, Smith & Reynolds, P.C.

[57] ABSTRACT

Electrons are arranged so they circulate along a spiral path in a vacuum. The path has a hollow symmetrical shape which is defined by a surface of a toroid. The shape is controllable by a magnetic field and the electrons can be contained within the shape. A containing force can be created by external electromagnetic fields, ions within the vacuum, or by interactions between the orbiting electrons themselves. The contained electrons store energy for later retrieval.

43 Claims, 15 Drawing Sheets

ARROWS INDICATE DIRECTION OF PARTICLE FLOW

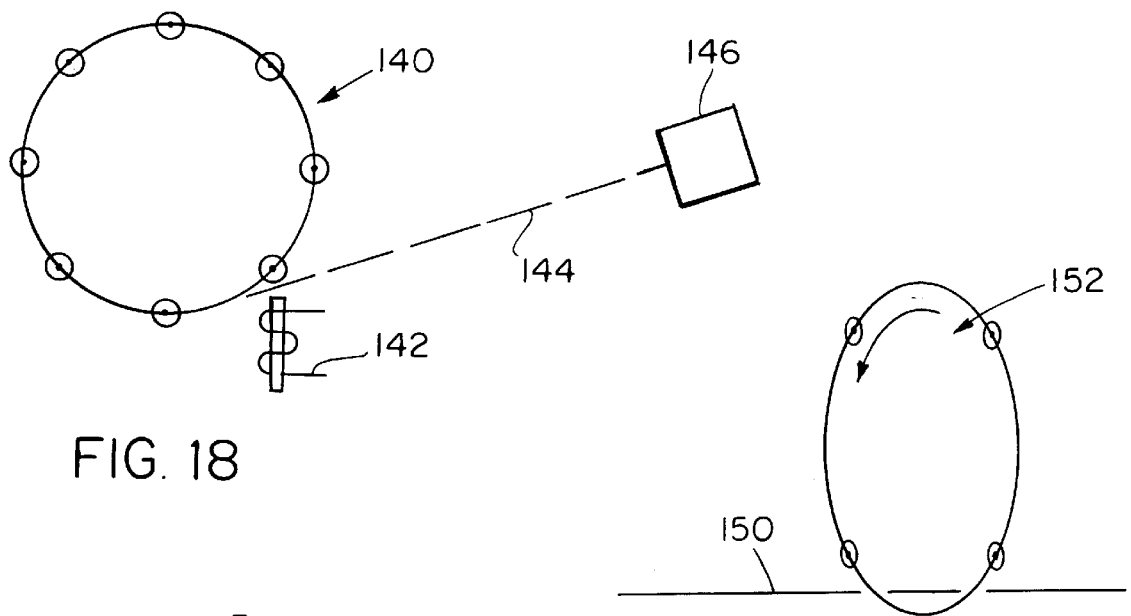
FIG. 18
FIG. 19
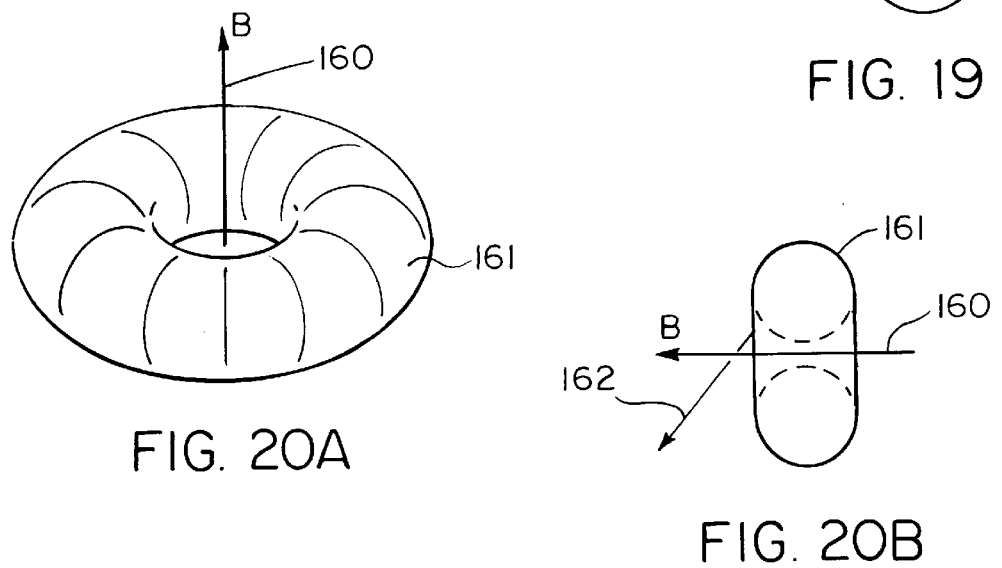
FIG. 20A
FIG. 20B
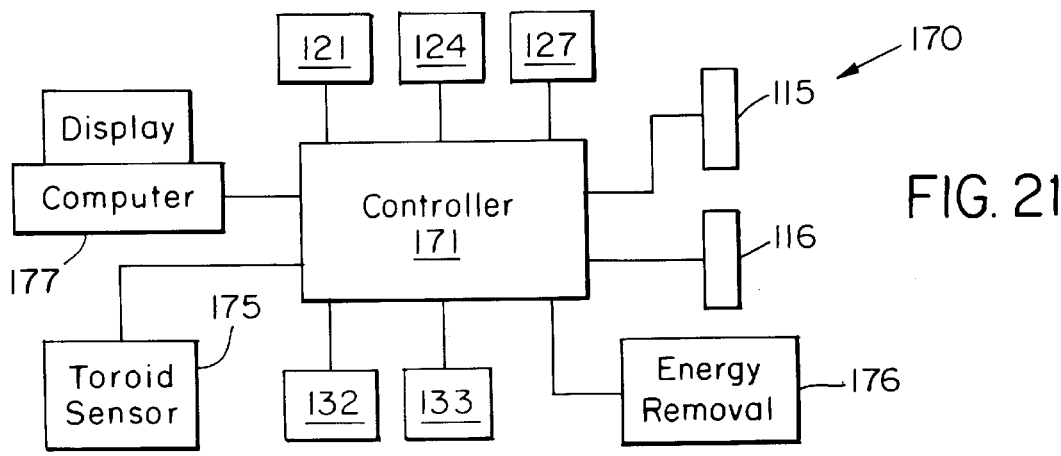
FIG. 21

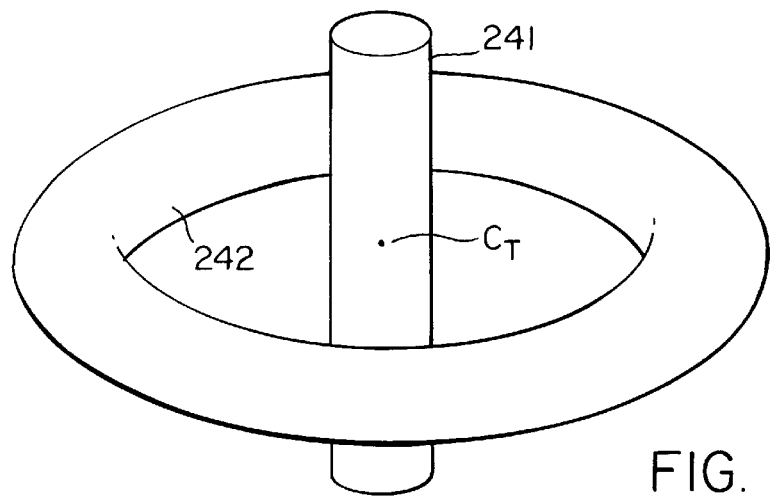
FIG. 25
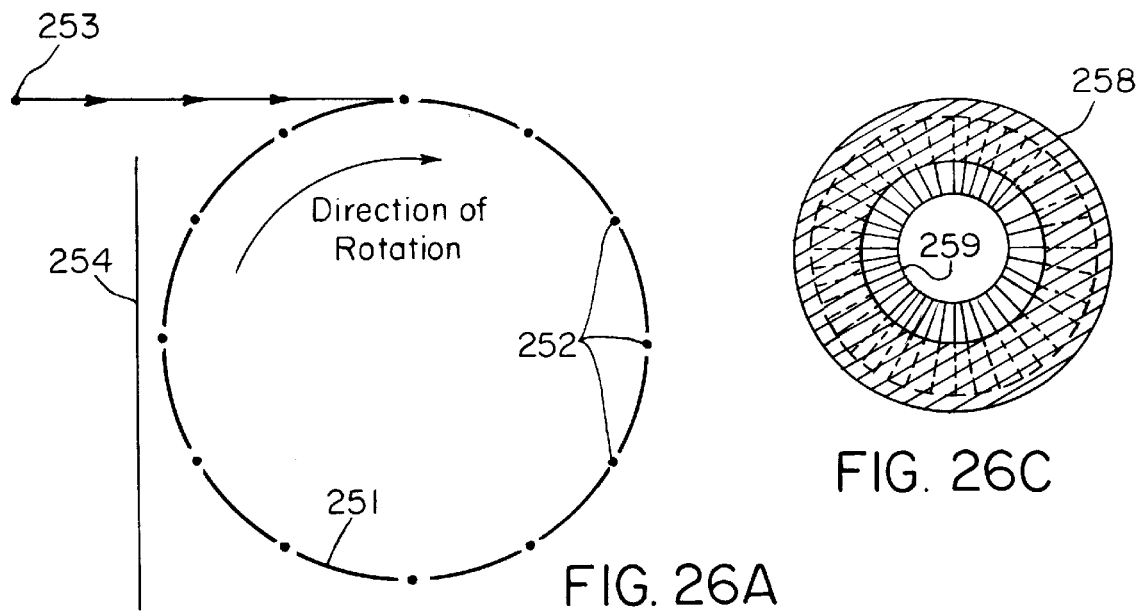
FIG. 26C
FIG. 26A
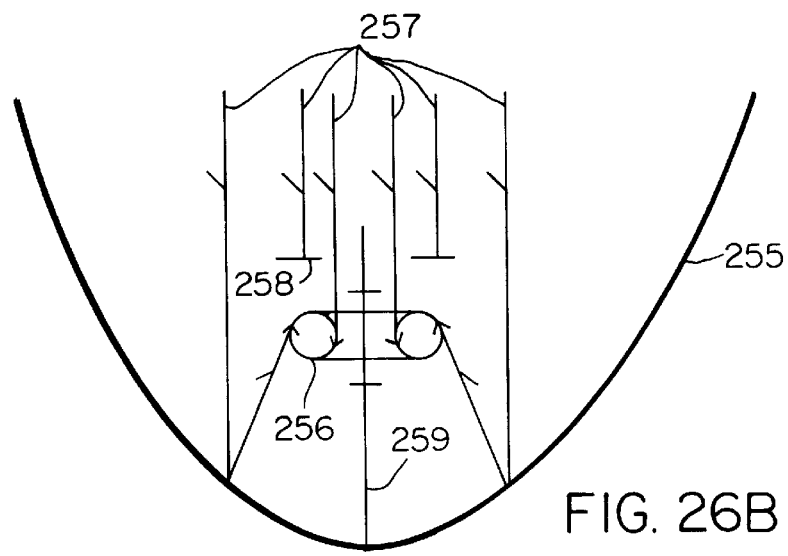
FIG. 26B 5,773,919

ELECTRON SPIRAL TOROID

RELATED U.S. APPLICATIONS

This is a continuation-in-part application of U.S. Ser. No. 07/996,752 filed on Dec. 24, 1992, which is a continuation-in-part application of U.S. Ser. No. 07/841,308 filed on Feb. 24, 1992 (now U.S. Pat. No. 5,175,466), which is a continuation application of U.S. Ser. No. 07/529,783 filed on May 25, 1990 (abandoned), which is a continuation application of U.S. Ser. No. 07/214,904 filed on Jun. 28, 1988 (abandoned), which is a continuation application of U.S. Ser. No. 06/914,629 filed on Oct. 2, 1986 (abandoned), the contents of which are incorporated herein by reference in their entirety.

BACKGROUND OF THE INVENTION

For the purposes of this invention, a plasma is defined as a collection of charged particles of like charge, that is, the plasma or plurality of charged particles can be either all negatively, or all positively charged.

At the present time, traditional fixed geometry plasmas are difficult to contain and utilize. One notable use of plasmas utilizing particles of opposite charge is in fusion reactors wherein the plasma is raised to high energy levels and contained within strong magnetic fields. The plasma is amorphous in shape in that it is contained as a ring shaped mass held in place by magnetic fields and includes particles of unlike charge having pathways or orbits within the ring that are not precisely fixed or defined.

A traditional use of a single charge plasma is in particle accelerators such as cyclotrons where charged particles are raised to high energy levels and contained by complex magnets. The shape of the mass of charged particles is essentially amorphous. A third use of charged particles is for electron beams. These beams are useful for welding and deposition, but are transient in nature and of a simple, line geometry.

What would be useful is a class of plasmas which require a low level of energy for containment. What would also be useful would be plasmas which can be maintained for long periods of time. This would open up many new applications, to include new energy storage methods.

SUMMARY OF THE INVENTION

A plasma geometry that is fixed rather than amorphous is provided by the present invention in which the particles move in definable paths. When so configured, the plasma will be containable and controllable to a far greater degree than an amorphous plasma. Energy can be added to or removed from the plasma in a well defined, simple, and controlled manner opening new possibilities for energy storage.

The system provides a generator for the fixed geometry plasma having a specific toroidal shape. The system shapes the plasma into a toroid using a circular magnetic field generated by a charged particle beam, a single conductor, or a toroidal conductor coil, or other method.

A plasma is shaped into a fixed and stable geometric form in which the orbit of the charged particles is definable and predictable. The geometry of the plasma will be a toroid, an elongated toroid, or any number of desirable shapes. The toroid will be hollow, with a thin shell of orbiting particles.

A fixed geometry plasma generator can include a vacuum, charged particle source, and a circular magnetic field. In one embodiment of the fixed geometry plasma generator a single conductor is used to generate a circular magnetic field. In another embodiment a charged particle beam is used to generate a circular magnetic field. In another embodiment a toroid conductor coil is used to generate a circular magnetic field. Described is a simple way to modify the toroid coil to generate an infinite family of fixed geometry plasmas.

A further embodiment of the invention relates to a vacuum tube system for energy storage. An electron source assembly can be sealed onto a port of the vacuum tube to provide controlled injection of electrons. Charged plates can be positioned about the vacuum system to add additional energy.

The novel features of this invention are set forth in detail in the appended claims. The invention will best be understood when read in with conjunction with the accompanying drawings and descriptions.

BRIEF DESCRIPTION IF THE DRAWINGS

Figure 1:
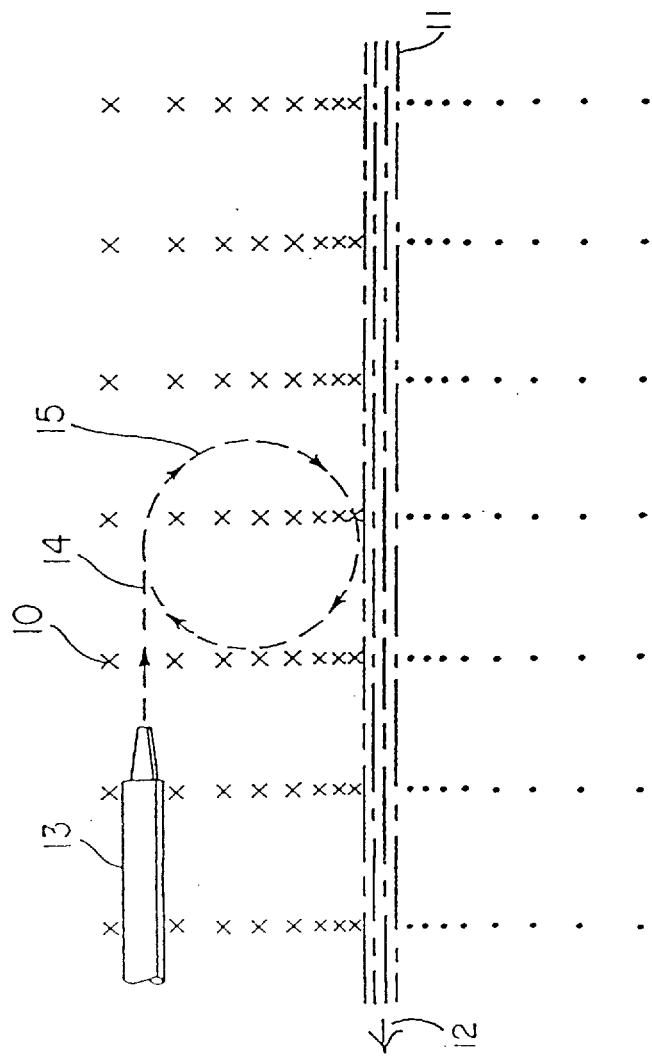
FIG. 1 illustrates a view of a preferred embodiment transverse to an initiating conductor.
Figure 4:
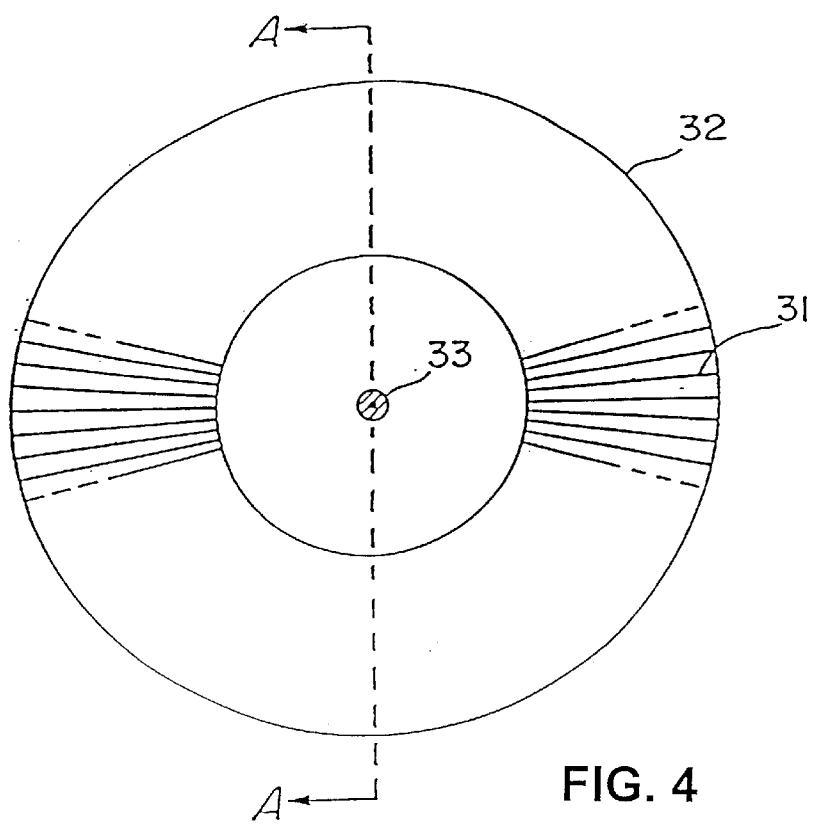

FIG. 4 provides a top view of the toroidal plasma of FIG. 1.

Figure 5:
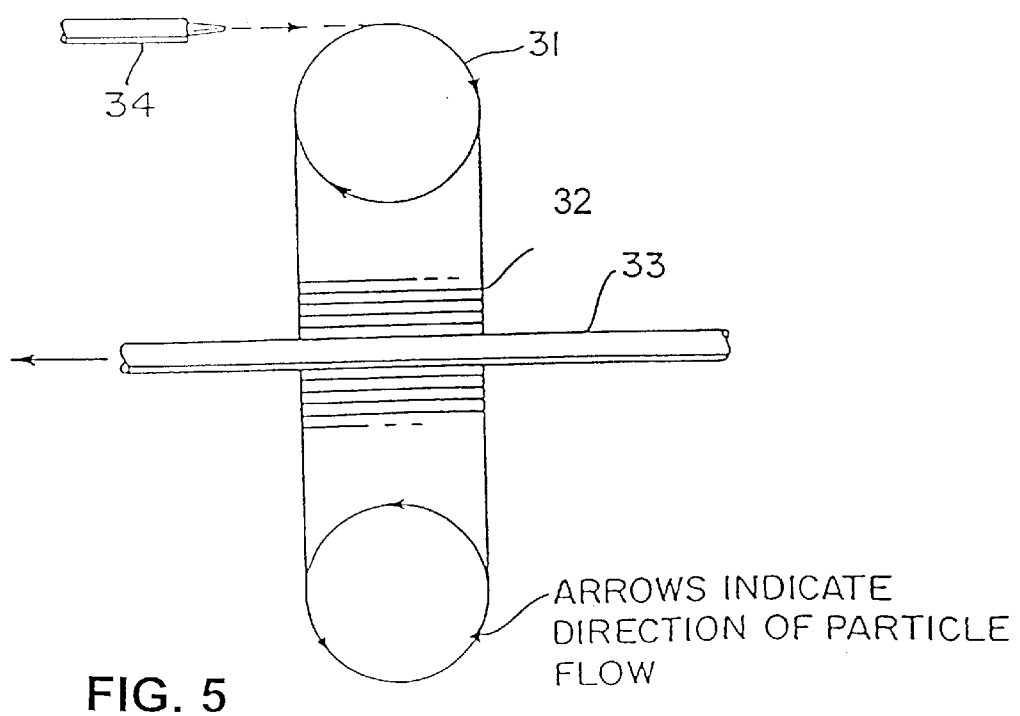

FIG. 5 provides a cross sectional view of the toroidal plasma of FIG. 1 taken along line A—A of FIG. 4.

Figure 6:
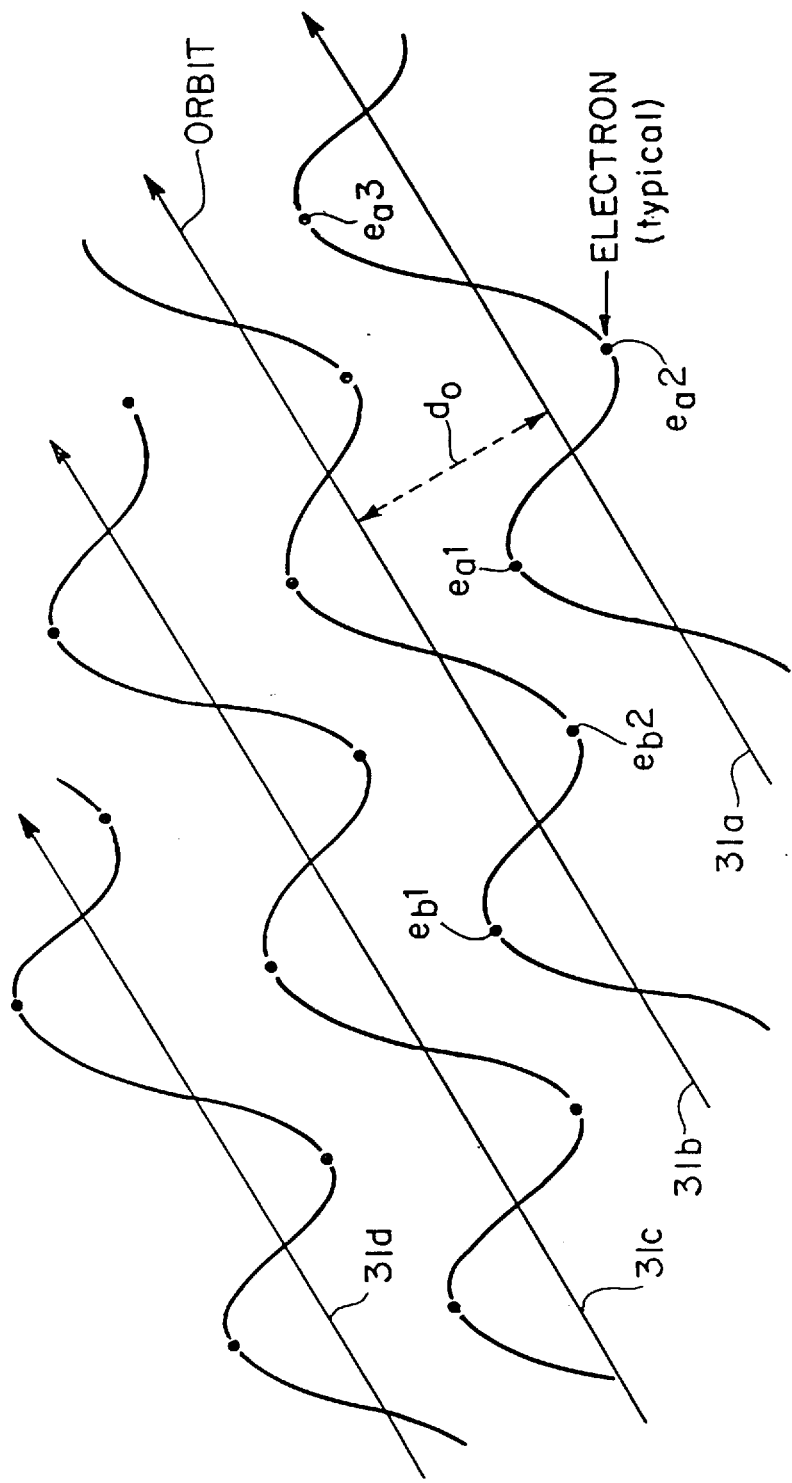

FIG. 6 illustrates at a microscopic scale four adjacent electron orbits.

Figure 7:
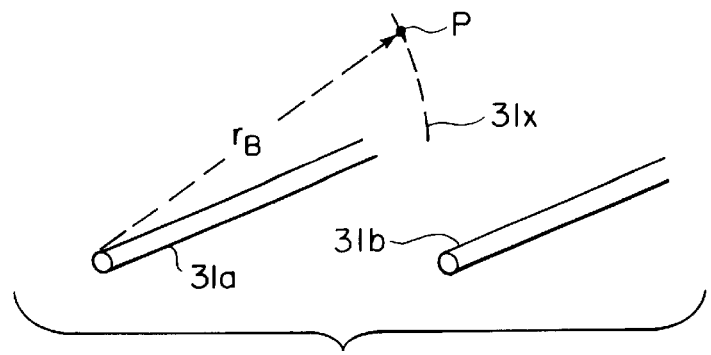

FIG. 7 illustrates the example of an electron which has a perturbed orbit at a distance from any given orbit.

Figure 8:
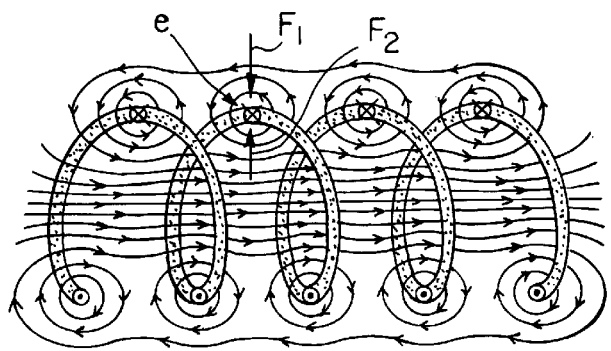

FIG. 8 illustrates forces acting upon an electron by the surrounding magnetic field which operates to contain the electron in the orbit.

Figure 9:
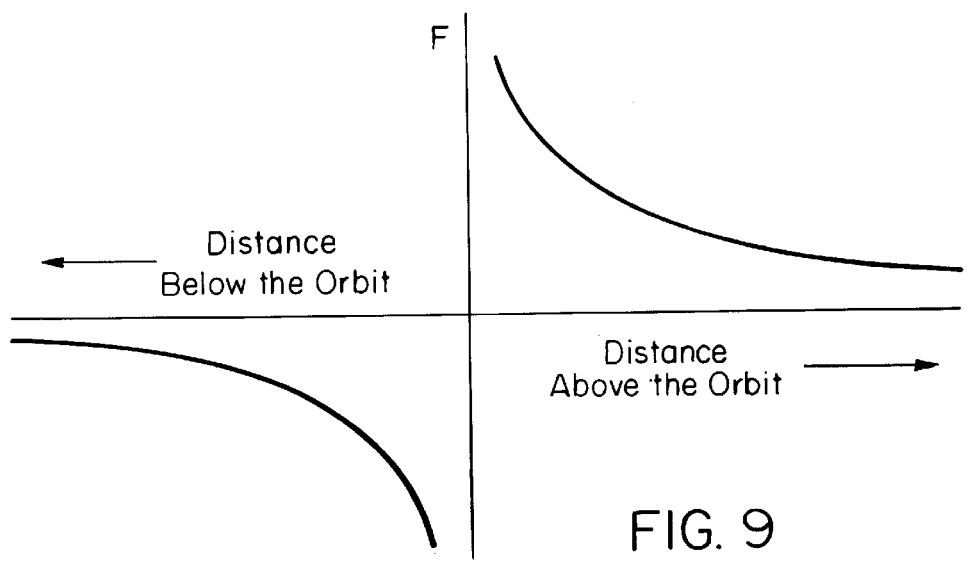

FIG. 9 graphically illustrates the forces acting on an electron when perturbed from its orbit.

Figure 10:
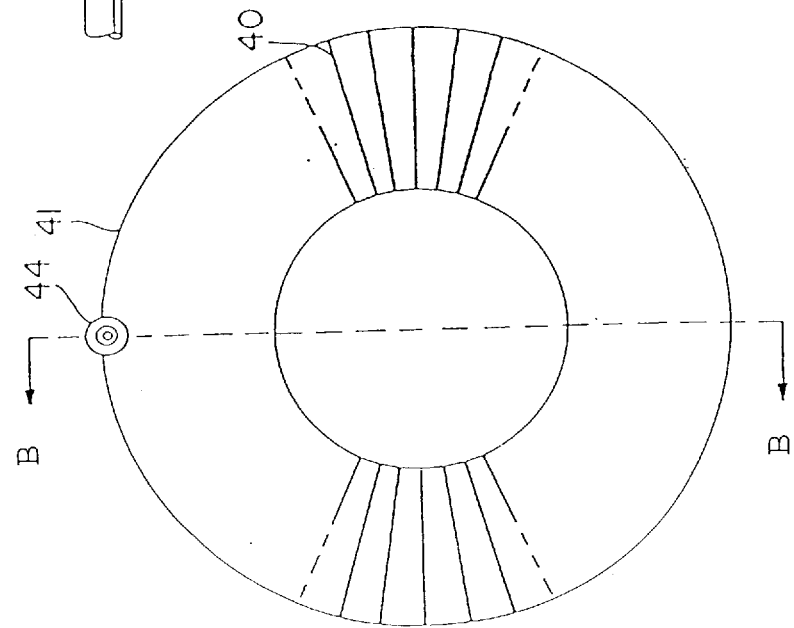

FIG. 10 is a top view of the toroidal conductor coil.

Figure 11:
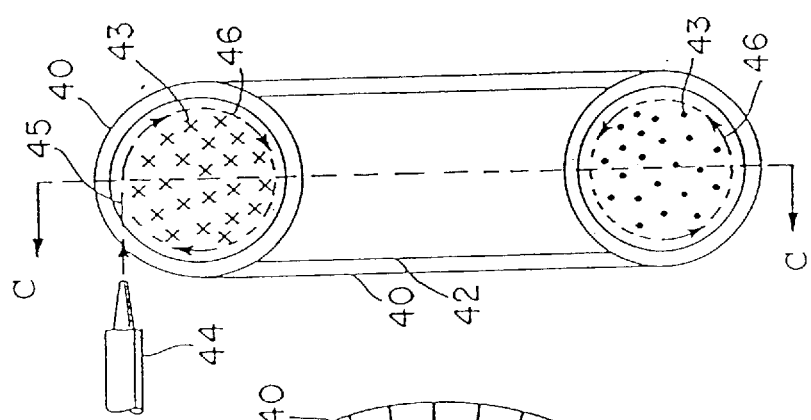

FIG. 11 is a cross sectional view taken along line B—B of the toroidal conductor coil of FIG. 10 with a toroid plasma internal.

Figure 12:
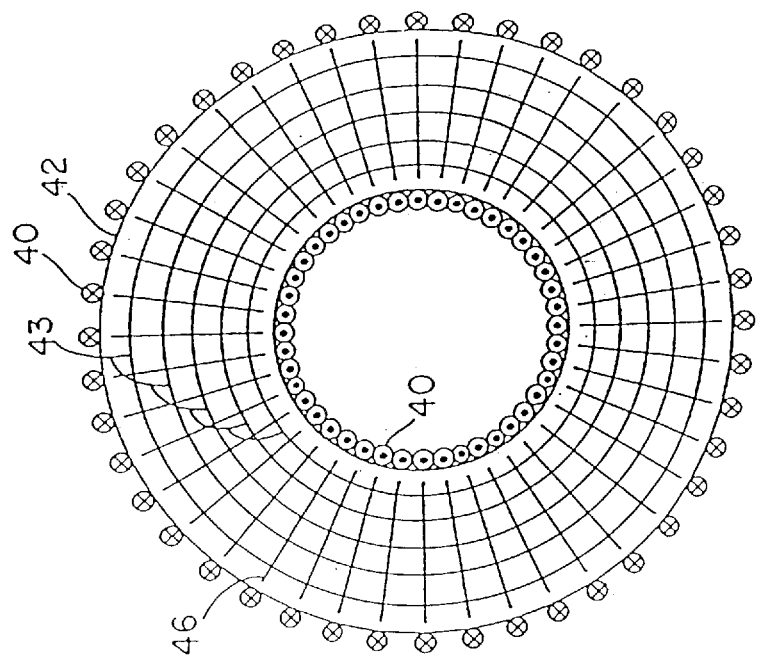

FIG. 12 is a cutaway top view taken along line C—C of the toroidal conductor coil of FIG. 11 with details of the internal toroid plasma.

Figure 13:
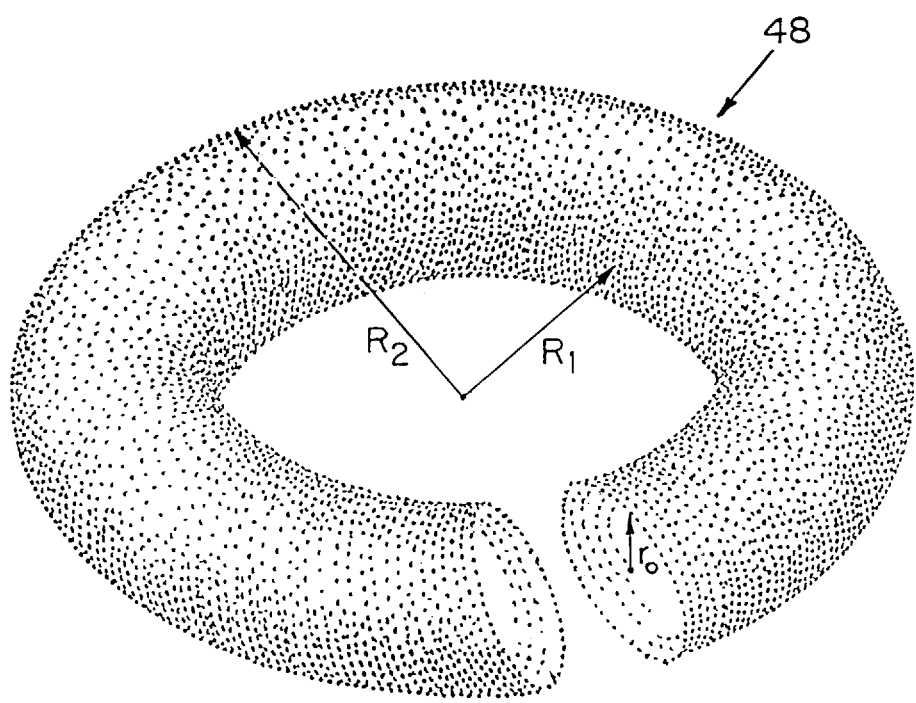

FIG. 13 is a partially cut-away perspective view of the toroidal geometry of the plasma.

Figure 14:
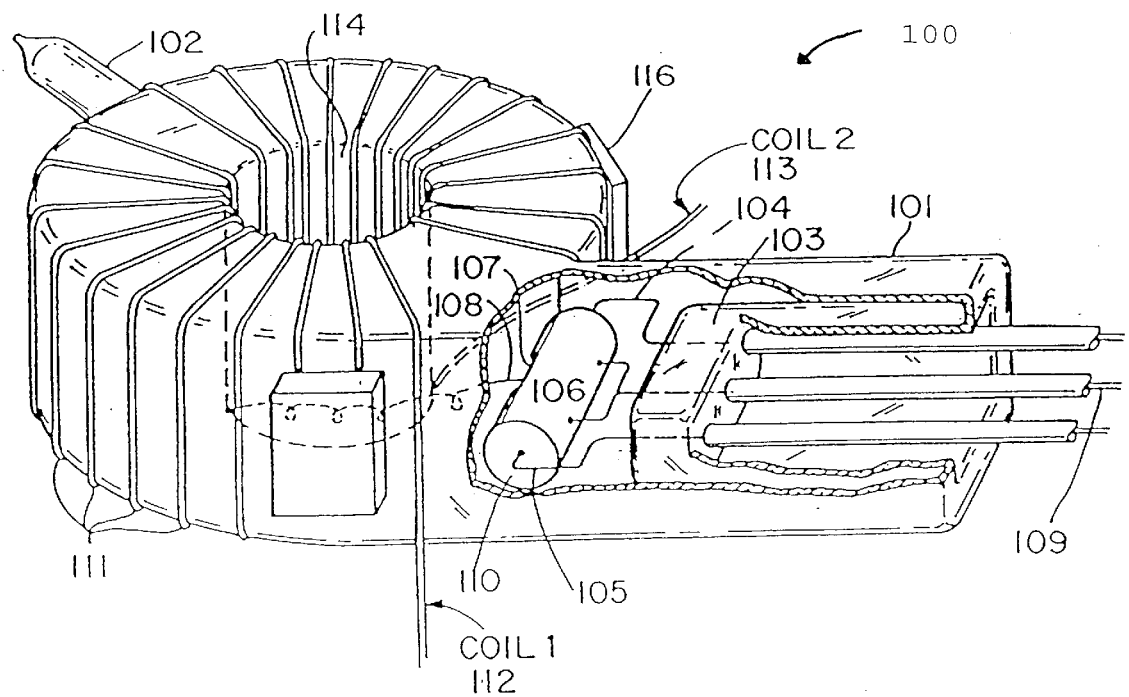

FIG. 14 is a partially cutaway perspective view of a toroid plasma tube.

Figure 15:
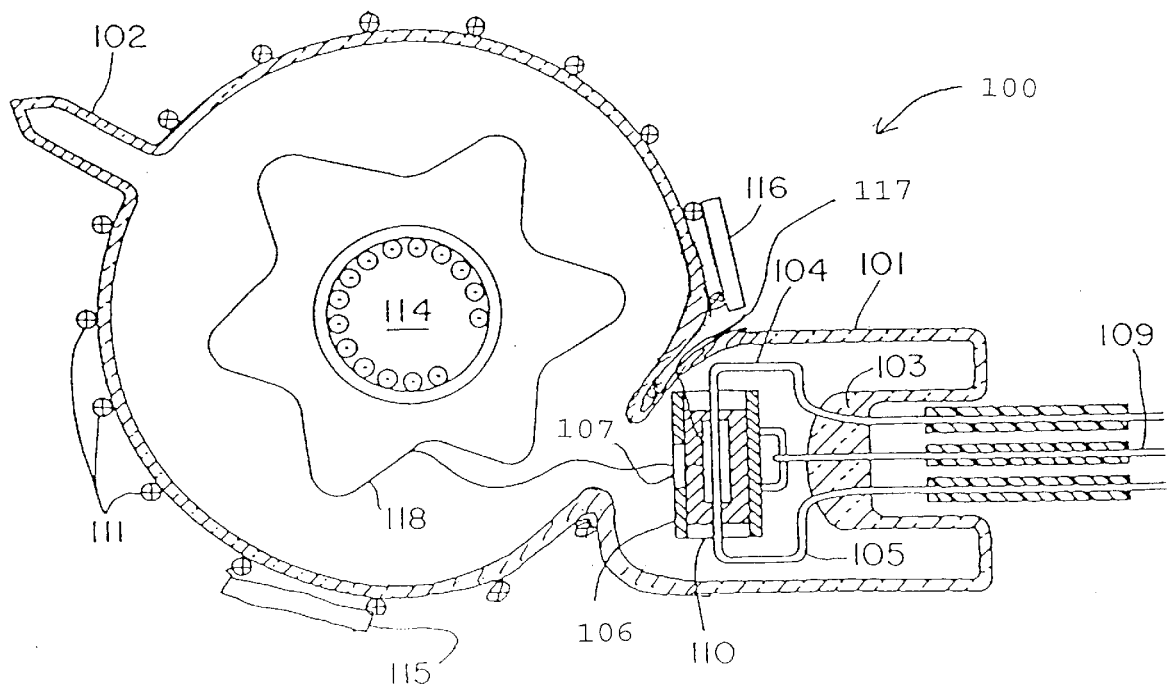

FIG. 15 is a cutaway top view of the toroid plasma tube of FIG. 14.

Figure 16:
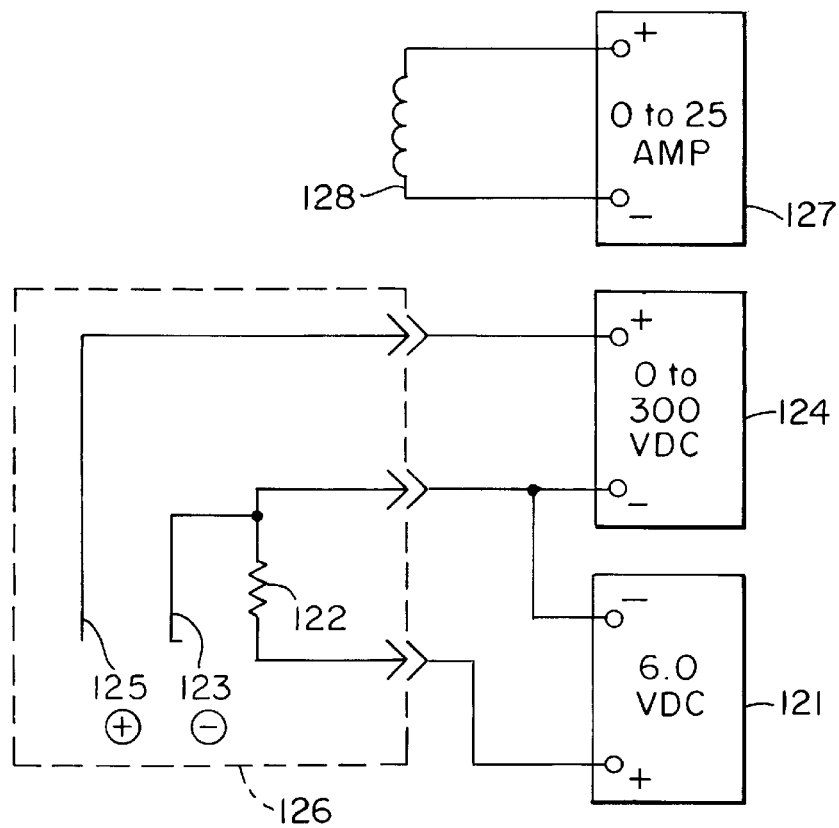

FIG. 16 is a schematic circuit diagram of the toroid plasma tube system.

Figure 17:
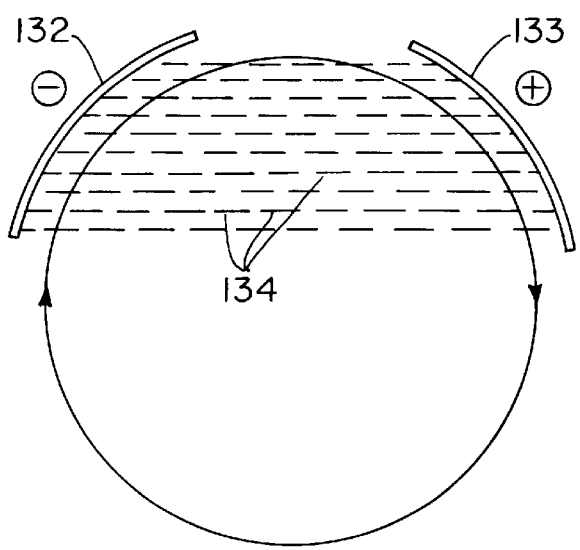

FIG. 17 is a schematic representation of a toroid employing accelerator plates.

FIG. 18 is a schematic illustration of a system for removing charge from the toroid.

FIG. 19 is a schematic illustration of a system for removing charge by magnetic induction.

FIGS. 20A and 20B illustrate perspective and side views respectively, for removing energy by magnetic field rotation.

FIG. 21 schematically illustrates a control system to be used with the present energy storage system.

Figure 22A:
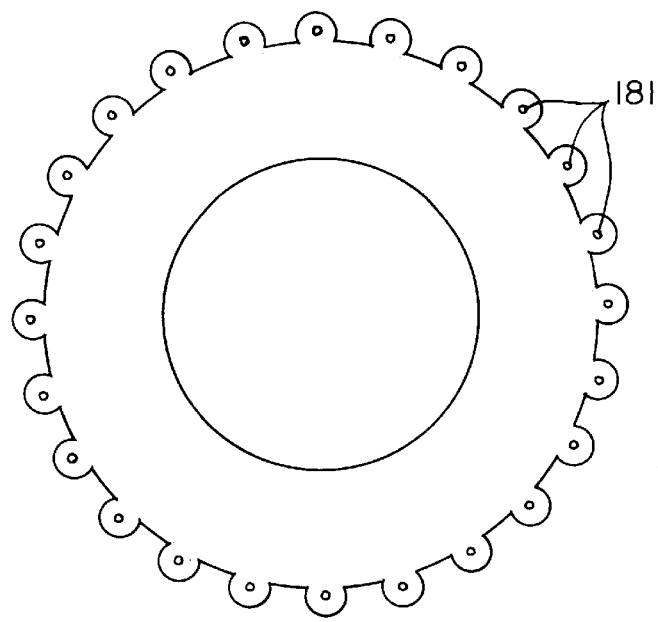

FIG. 22A schematically illustrates a vacuum chamber with a plurality of electron sources arrayed symmetrically about the chamber.

Figure 22B:
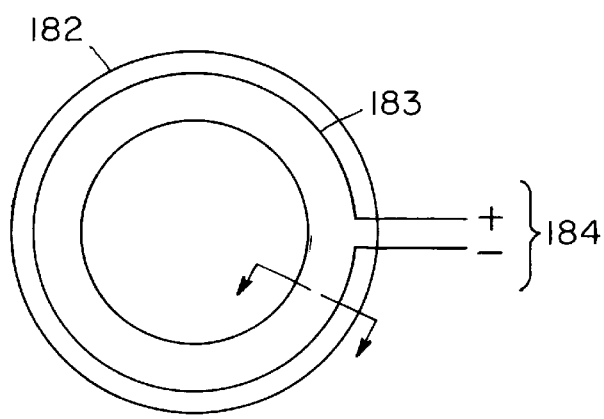
Figure 22C:
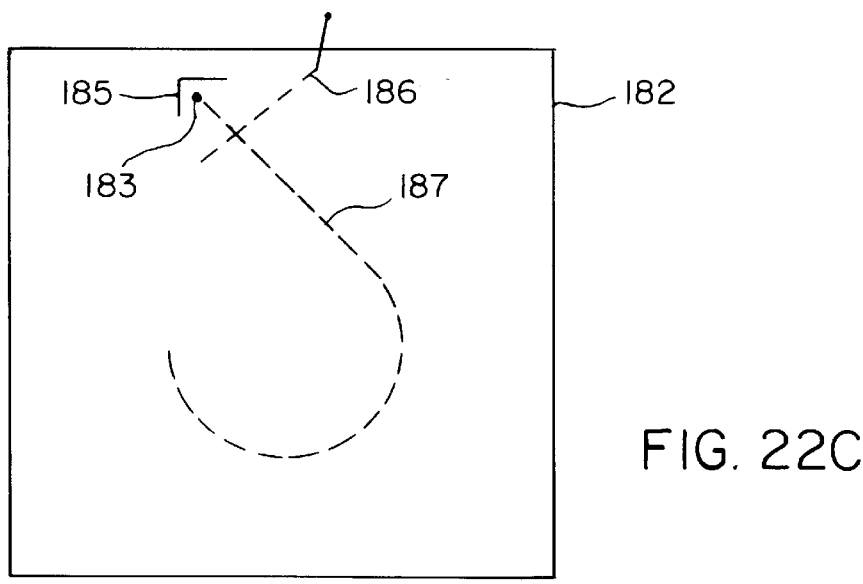

FIGS. 22B and 22C are top cross-sectional and indicated cross sectional views of a filament electron source.

Figure 23:
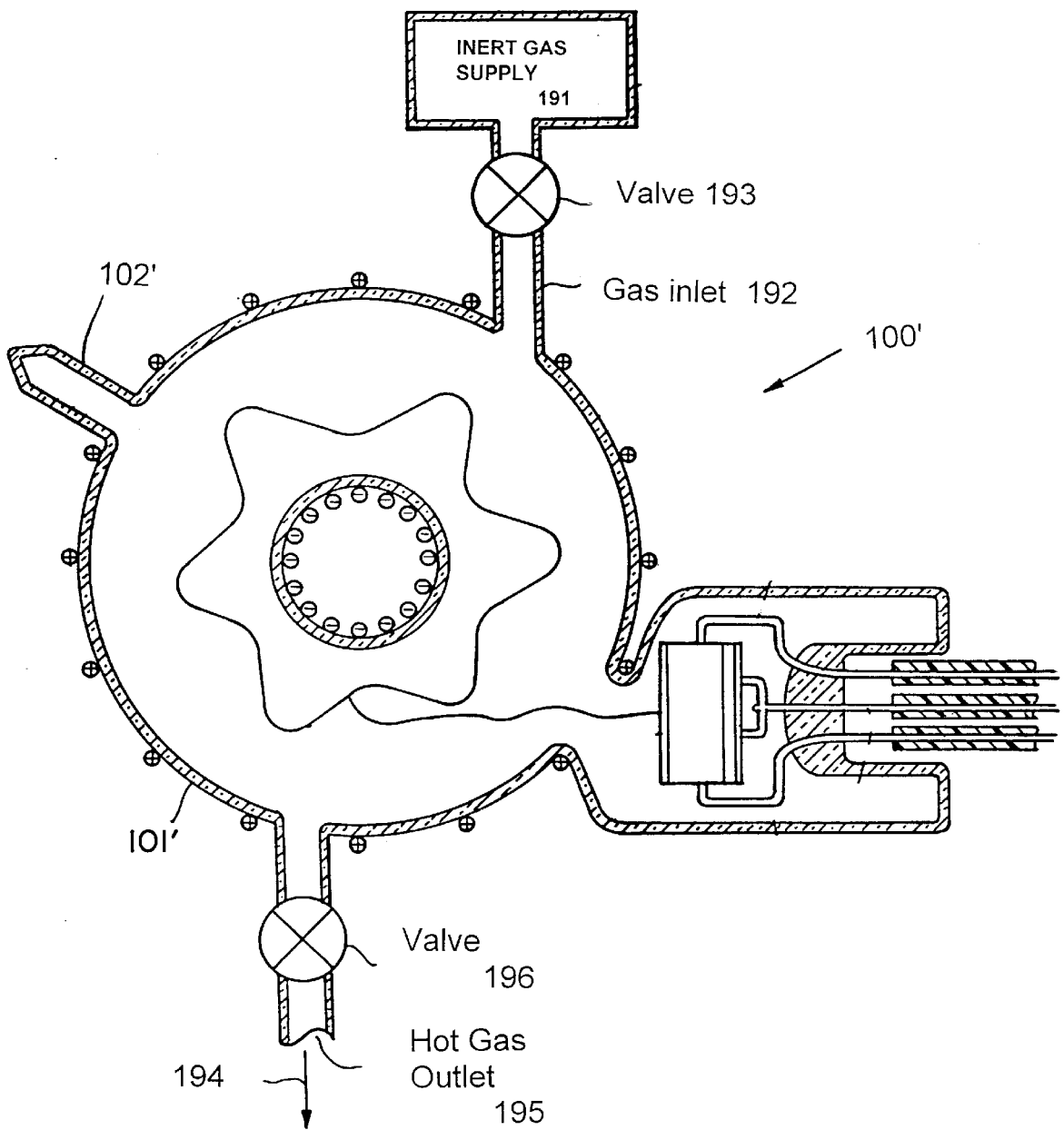

FIG. 23 illustrates a system for removing energy from a vacuum tube system using a gas flow system.

Figure 24:
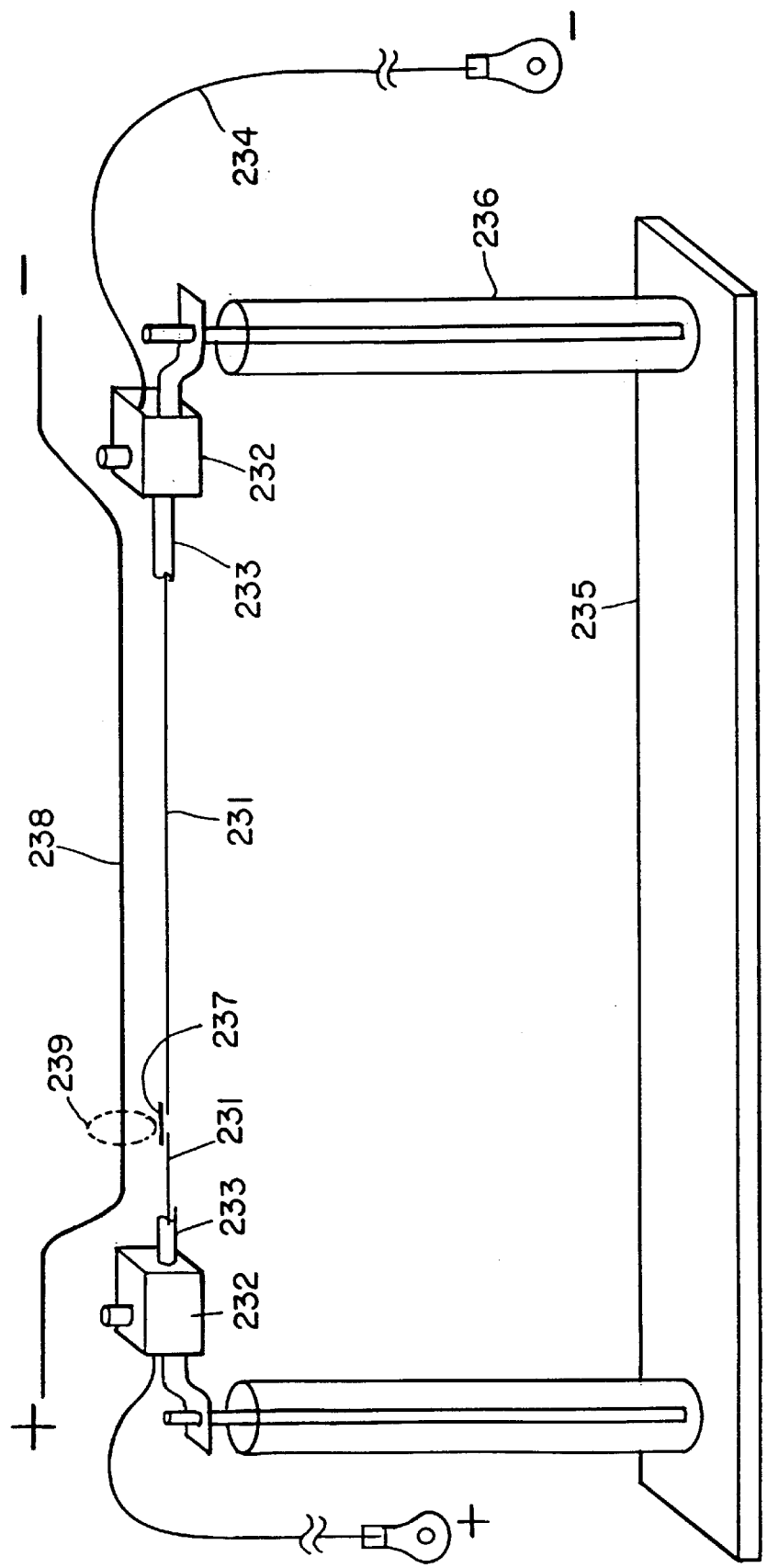

FIG. 24 illustrates an electrode and single turn coil for initiating and containing an electron spiral toroid.

FIG. 25 illustrates a charge accumulator for neutralizing the charge of the toroid.

FIGS. 26A–26C are schematic diagrams of a charger for adding energy to a toroid.

Figure 27:
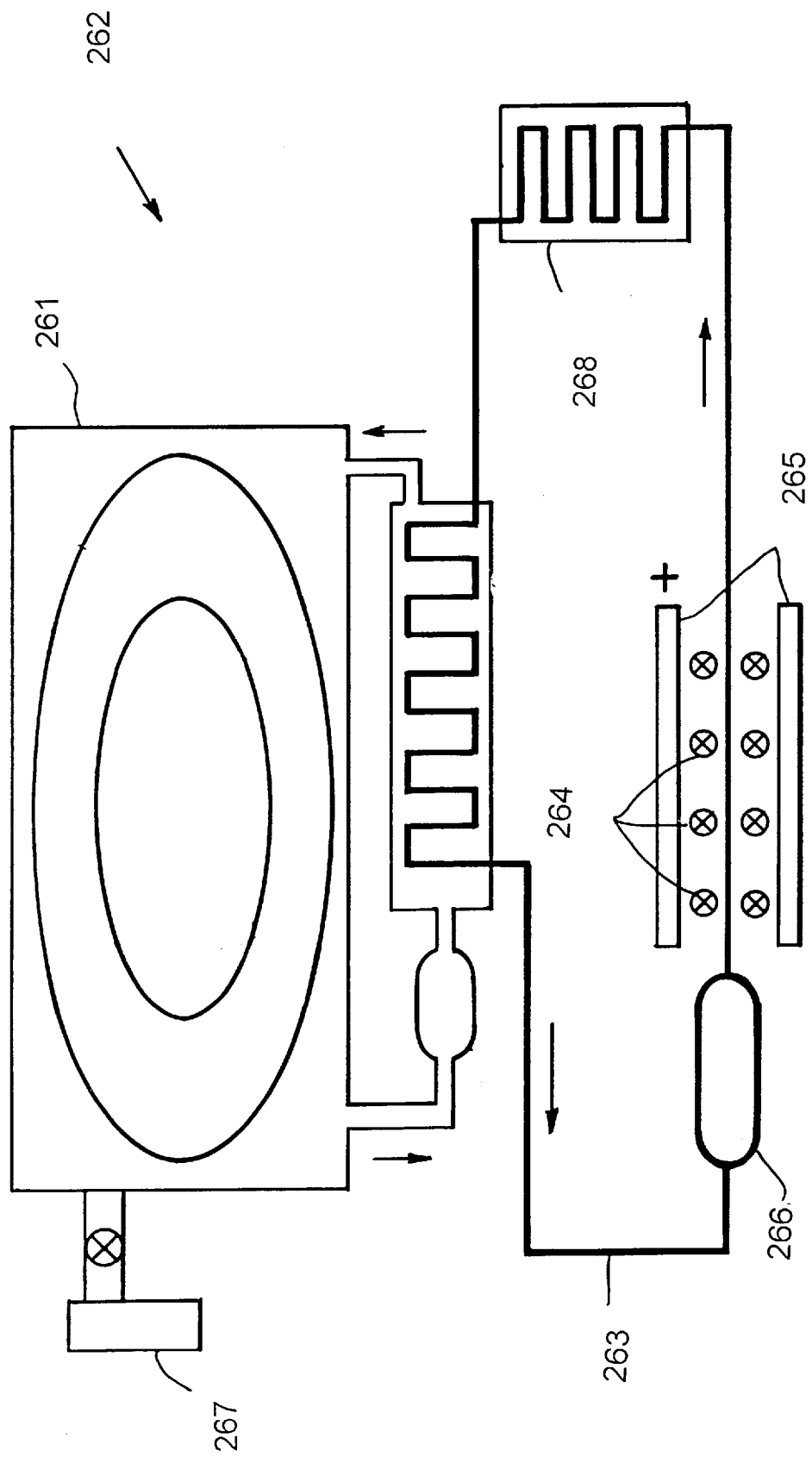

FIG. 27 illustrates a magnetohydrodynamic system for converting removed heat energy into electric power.

DESCRIPTION OF THE PREFERRED EMBODIMENT

A single charge plasma is defined as a collection of charged particles of the same charge. Examples of charged particles are electrons and ions.

A toroid is defined as a surface generated by the rotation of a plane closed curve about an axis in the plane. A typical toroid has a donut shape in a three dimensional configuration.

Figure 2:
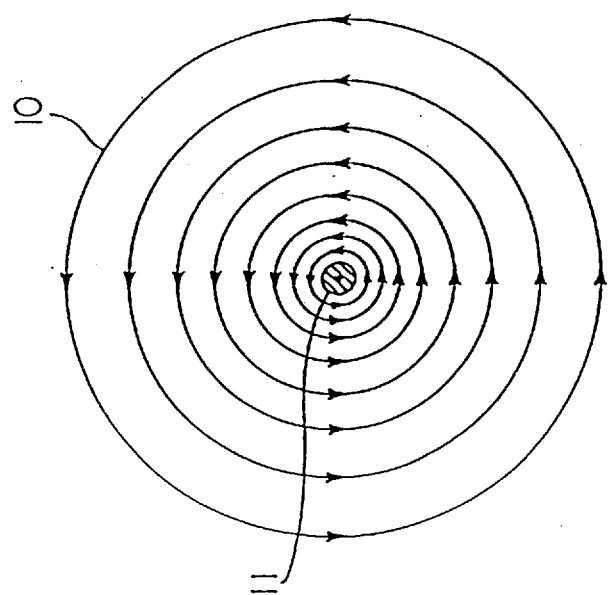
FIG. 2 is a cross sectional view of the circular magnetic field of FIG. 1 taken perpendicular to the conductor.

FIG. 1 illustrates a view of a preferred embodiment transverse to an initiating conductor. The elements required to initiate an electron plasma toroid are an electron beam 14, a circular magnetic field, and a vacuum. Circular magnetic field lines 10 are shown. Using conventional notation, an "x" indicates field line in the direction into the page, where a "." indicates a line out of the page. FIG. 2 is a cross sectional view of the circular magnetic field of FIG. 1 taken perpendicular to the conductor.

A method of generating the circular magnetic field is shown in FIG. 1 using an electrical conductor 11 carrying an electrical current 12 in the direction shown. The conductor 11 can be a single conductor, a series of conductors, or a charged particle beam as long as an electrical current is present which creates a sufficiently strong circular magnetic field. The chamber into which the charged particles are injected is evacuated.

An electron beam source 13 is used to initiate the electron beam 14. The electron beam 14 will curve as shown in FIG. 1 due to the presence of the magnetic field in accordance with F=BVq, a basic law of physics where F is force, B is magnetic field strength, V is particle velocity, and q is particle charge. The electron beam 14 can be replaced with a charged particle beam, either positively or negatively charged, although care must be taken to allow for proper rotation in the circular magnetic field in accordance with the laws of physics. The shape of the orbit is defined by the balance of forces F=BVq and F=ma where m is the mass of the particle and a is the acceleration. If the circular magnetic field and rotational force of the charged particle are in balance, similar to a cyclotron, the beam 14 will form a circular orbit 15 as shown.

As the electrons rotate in the magnetic field multiple orbits will form. The multiple orbits will spread out into a spiral because like charges repel. The electron beam 14 can be slightly at an angle to the axis of the conductor 11 to facilitate the spreading and spiraling of the electrons.

Figure 3:
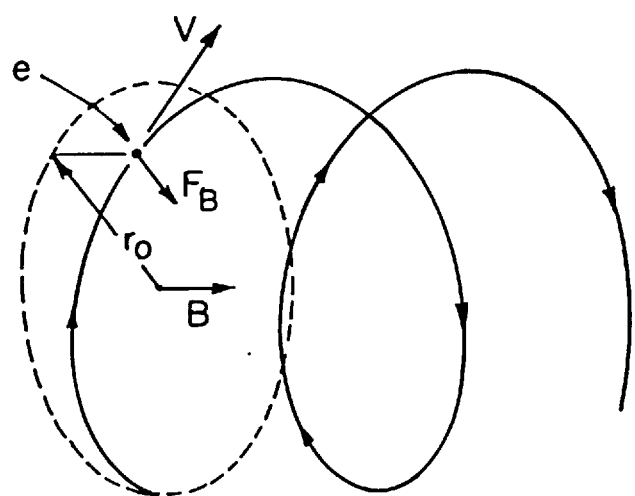
FIG. 3 is a schematic diagram of a spiraling electron orbit.

FIG. 3 is a schematic diagram of a spiraling electron orbit 31. As illustrated, an electron e spirals around the central axis of the magnetic field at a radius $r_o$ due to the magnetic force $F_B$.

The orbit of the electrons is generally circular, but may vary somewhat from circular as a function of the change in strength of the magnetic field as the distance from the conductor increases. In a typical configuration the electron velocity V is approximately $5*10^7$ meters/second. The velocity V can vary from higher to lower values as long as the balance of forces is maintained. The velocity of all the electrons is substantially uniform. The circular magnetic field in a preferred embodiment is generated by an approximately 1000 amp-turn coil. The current may vary from higher to lower values as a function of force required to retain the electrons in orbit.

FIG. 4 provides a top view of the toroidal plasma of FIG. 1. As the electrons spread out, they remain in the orbits 31 due to the force of the circular magnetic field, but spread as shown into a toroid 32. This results in an electron plasma toroid. The orbits 31 are connected as one large spiral and the number of orbits can vary. If the electrons are replaced with charged particles, the result is a charged particle plasma toroid.

FIG. 5 provides a cross sectional view of the toroidal plasma of FIG. 1 taken along line A—A of FIG. 4. Note the conductor 33 and the electron beam generator 34. The details of the circular magnetic field are omitted in FIGS. 4 and 5, to allow a clearer picture of the toroid, but would be similar to those shown in FIGS. 1 and 2.

The circular magnetic field can be generated in many ways. The conductor approach is perhaps the simplest in concept. The conductor can be replaced with a charged particle beam. A particle beam and a plasma are best generated and maintained in a vacuum where the reduced atmosphere will reduce collisions between gas molecules and particles. The collisions with air or gas molecules will shorten the life of the plasma. Vacuum levels required to establish a particle beam are well known. As a rule, the better the vacuum the fewer collisions and the longer the life of the plasma. The vacuum level in the present embodiment is about $5*10^{-4}$ millibar (mb) ($5*10^{-7}$ atm). Lower vacuum levels are preferred as collisions will be minimized thereby increasing mean beam length and reducing the energy needed to maintain the beam. A vacuum in the range of $10^{-3}$–$10^{-5}$ mb ($10^{-6}$–$10^{-8}$ atm) is preferred.

When the electron plasma toroid has been initiated, the electron plasma toroid can be held in place by any of several external force mechanisms. First, the circular magnetic field can be maintained, or secondly, a suitable electric field can be used, or thirdly, ions in the vacuum chamber, being of opposite charge, will provide a suitable restoring force under some circumstances. The original circular magnetic field can be removed and the electron plasma toroid will substantially retain its configuration if a sufficient number of electrons are in the plasma and sufficient ions are present or a suitable electric field is present. In addition, under some circumstances, the geometry of the toroid will be varied automatically by internal forces to hold the toroid in a stable configuration.

Initiation

The initiation of an Electron Spiral Toroid (EST) requires that a balance of forces be maintained between the spiral of electrons and the circular magnetic field. The formulas for this are the same as for a cyclotron.

The electron spiral motion is caused by a magnetic field established by an initiating coil. Consider an electron beam as it first enters the initiating coils. If the beam enters the coils at an angle to the magnetic field, it will cross magnetic field lines which will cause the electrons in the beam to begin to spiral. The electron motion at this moment of initiation will be established by three forces: the force from the magnetic field; the rotational force of the electrons; and the coulombic force from the other electrons in the beam.

The force of rotation and the coulombic force tend to force the electrons into expansion away from the initial beam. The initiating coils need to establish a magnetic field great enough to counter the coulombic force and the rotational force. This balance is demonstrated for electrons in a beam as described below.

The force of rotation of an individual electron is $$F(R) = \frac{MV^2}{r_o}$$

where, M is the electron mass of $9.11*10^{-3}$kg;

V is the electron velocity; and $r_o$ is the radius of the electron orbit.

(From "Physics for Students of Science and Engineering", Halliday and Resnick; John Wiley & Sons, Inc. p. 702)

The force countering F(R) is F(L), the force initiated by the magnetic field created by the initiation coils.

$$F(L) = qVB$$

where, q is the electron charge;

V is the electron velocity; and

B is the magnetic field of the coil.

Since the initiating coil is a toroid, the magnetic field is derived using Ampere's Law:

$$\frac{1}{\mu_o} \oint B \cdot dl = i$$

This gives B for a toroid as:

$$B = \frac{\mu_o iN}{2\pi r_t}$$

where, $\mu_0$ is the permeability constant of $1.26*10^{-6}$ henry/meter;

i is the current in the coil windings;

N is the number of coils; and $r_t$ is the toroid radius.

Establishing a balance of forces between F(R) and F(L) is a matter of controlling the velocity of the electrons and balancing that with the product of the coil current and number of turns.

In this configuration the electrons spiral completely around the circular magnetic field.

Contained Toroid

The EST will remain contained after initiation under some circumstances. This occurs when a sufficient number of electrons are present and when the electrons are at an appropriate velocity to achieve a containing balance with external forces. This containing balance of forces occurs when the total charge trying to push the electrons outward matches the magnetic field created by the circulating electrons which tries to squeeze the electrons together. In cases where this balance is not complete, stability can be achieved with one of several externally applied forces. These external forces can be the initiating magnetic field, an externally applied magnetic field, an electric field, or the repulsive force of ions in the atmosphere of the partial vacuum in the toroid chamber.

The total charge of electrons creates a space charge. Because all electrons have the same charge, they will all repel each other.

Coulomb's Law states that the force of diffusion for two electrons is:

$$F(C) = \frac{1}{4\pi\epsilon_o} \frac{q_1 q_2}{d}$$

where, q is the electron charge;

d is the distance between the electrons; and $\epsilon_O$ is the permittivity constant.

Gauss's Law can be applied to show that for a spherical Gaussian surface of radius r, the electric field has the value it would have if the charge were concentrated at its center. Similarly, for the electron plasma toroid taking into account that its surface is a toroid, $$F(C) = \frac{nqq}{16\pi\epsilon_o} r_p^2$$

where, n is the total number of electrons; and $r_p$ is the distance from the toroid center to the farthest electrons.

Due to the construction of the toroid, this is the worst case force for repulsion on an electron.

Note that F(C) will force the electrons outward from the center of the toroid. This forces the electrons to reside on the surface of the toroid as a sheet of charge. Note also that when the electrons reside on the surface they will be subject to local electrostatic forces between electron orbits which will cause the electron orbits to be approximately equidistantly located from each adjacent electron orbit. As the size of each electron is small relative to the electron orbit radius, the electrostatic repulsion forces from electron to electron can be considered.

The balance of forces between electrons in a spiraling beam and the magnetic field of the initiating coil is achieved when $$F(R)+F(C)=F(L)$$

FIG. 6 illustrates at a microscopic scale four adjacent electron orbits. Shown are portions of four orbits 31a–31d, with electrons $e_a1$, . . . ,$ed_4$ and electron orbits 31a–31d spaced equidistantly by a distance $d_o$.

Countering the space charge repulsion are the magnetic fields created by the circulating charge of the electrons. These are considered on a microscopic basis, that is, on an orbit-to-orbit basis.

With the electron plasma toroid, the electrons in orbit are a current and create a magnetic field. From Ampere's Laws:

$$\frac{1}{\mu_o} \oint B \cdot dl = i$$

The toroid has great symmetry making the individual electron orbits behave as straight wires for the purpose of analysis. Thus, Ampere's Law reduces to:

$$\frac{1}{\mu_o}(B)(2\pi r_B) = i$$

or $$B = \frac{\mu_o i}{2\pi r_B}$$

where, i is the current in an orbit; and $r_B$ is the distance from one orbit to the point of interest.

FIG. 7 illustrates the example of an electron e which has a perturbed orbit 31x at a distance $r_B$ from any given orbit 31a. Shown are two orbits 31a, 31b coming out of the page. The magnetic field of the left orbit is shown at distance $r_B$.

Assume an electron is perturbed from orbit to point P in FIG. 7, the restoring force is F(M)=qVB.

FIG. 8 illustrates forces acting upon an electron e by the surrounding magnetic field which operates to contain the electron in the orbit. Shown is the total field of the interacting orbits. Because the magnetic field has a different direction above and below the orbit, there is no magnetic field directly at the location of the orbit. This means the electron will move above or below the orbit based on the other forces present. To be totally correct, the forces of rotation must be included here. However, those forces are many orders of magnitude less than the magnetic and coulombic forces, and have been left out for simplicity.

The total force on the perturbed electron is the sum of the forces of all the orbits. Each orbit contributes to the restoring force, with closer orbits contributing more and distant orbits contributing less. A force $F_1$ above the orbit will act downward, while a force $F_2$ below the orbit will act upward as shown in FIG. 8. FIG. 9 graphically illustrates the forces acting on an electron when perturbed from its orbit.

To contain the toroid, an external force is applied to overcome any difference between the expansion force of the space charge and the restoring force of the magnetic fields. The external force can be one or a combination of the following: the initiating magnetic field, an external magnetic field, an external electric field, or the repulsion force of ions near the electron surface due to the atmosphere remaining in the toroid chamber.

Example of Preferred Embodiment

A quantitative example of initiating and containing an EST is described below:

Initiation:

$$F(R) = \frac{MV^2}{r_o}$$

$$= 1.33 * 10^{-13} \text{ Newton}$$

with

V=9.37*10$^7$ m/s; and $r_o$=0.06

$$F(L) = qVB = \frac{qV\mu_o iN}{2\pi r_t}$$

$$= 1.33 * 10^{-13} \text{ Newton}$$

with $r_t$=0.42 m;

i=5.3 Ampere; and

N=2500.

Containing:

$$F(C) = \frac{nq^2}{16\pi\epsilon_o r_p^2}$$

The magnetic restoring force F(M), plus the externally applied force, must be large enough to overcome the space charge.

Alternative Preferred Initiating Embodiments

FIGS. 10, 11, and 12 show an alternate method for initiating a single charged plasma particle toroid. FIG. 10 is a top view of the toroidal conductor coil; FIG. 11 is a cross sectional view taken along line B—B of the toroidal conductor coil of FIG. 10 with a toroid plasma internal; and FIG. 12 is a cutaway top view taken along line C—C of the toroidal conductor coil of FIG. 11 with details of the internal toroid plasma. The circular magnetic field is initiated by utilizing a conductor toroid consisting of an electrical conductor 40 wound in the shape of a toroid 41 around a casing 42. The casing 42 is made of a suitable material such as glass which can withstand a vacuum. The casing 42 is shown in FIGS. 11, and 12. The circular magnetic field 43, shown schematically in FIGS. 11, and 12, will be created when a current is sent through the electrical conductor 40.

The number of windings required is a function of the circular magnetic field strength required and the strength of the electrical current which flows through the electrical conductor 40. With 1000 turns in the conductor toroid, the circular magnetic field created by 3 to 6 amperes would be comparable to the circular magnetic field generated by a 3000 to 6000 ampere current in a single conductor.

The number of windings is shown schematically in FIGS. 10 and 12 and will vary depending on the current per conductor and the required magnetic field. An electron beam source 44 is used to initiate an electron beam 45. The beam spreads out into an electron plasma toroid inside the conductor toroid. A typical orbit 46 spreads into a spiral as described previously in connection with FIGS. 3 and 4.

FIG. 13 is a partial cut-away perspective view of the toroidal geometry of the plasma. When initial conditions have been properly established, the spiraling electron beam curves around the circular magnetic field and rejoins itself. The electrons in the rejoined spiral form a current ring with a toroidal path 48 as illustrated. The toroid is a sheet of current having a hollow, thin, spiraling sheet of electrons. The electrons spiral with a radius $r_o$. The toroid is illustrated as a circular toroid having an inner radius $R_1$ and an outer radius $R_2$, where $R_2=R_1+2r_o$.

The coil can be elongated into an oval form and still maintain a plasma of a fixed geometry, although not toroidal. The coil can be altered in an infinite number of slight variations but still maintain a plasma of fixed geometry (slightly varied from toroidal).

FIG. 14 is a partial cut-away perspective view of a toroid plasma tube 100. The tube has a glass enclosure 101. The glass enclosure is a vacuum tube material suitable to hold a vacuum in the range $10^{-4}$–$10^{-8}$ mb ($10^{-7}$–$10^{-11}$ atm). The tube 100 in this embodiment has a diameter of about four inches. The orbital cavity is 1.5 inches high along the outer and inner walls. The dimensions of the tube 100 depends upon the particular application.

A vacuum port 102 is used to evacuate the tube 100 to remove all gases, as is typical for a vacuum tube. After evacuation of the tube 100, the port 102 is sealed to retain the vacuum. Alternately, a standard vacuum flange can be fitted to the vacuum port to allow evacuation. A glass base 103 is provided to position the electron source assembly and to pass wires from outside the tube 100 into the vacuum.

As in many vacuum tubes, a filament is provided and is heated to facilitate electron flow. Power is supplied to the filament through a wire 104 to a resistance wire (see FIG. 15) and to ground return through wire 105. This provides heat which creates free electrons at the cathode (see FIG. 15). This is a well-known technique and can be done in many ways.

The electrons are accelerated by the anode 106. The anode 106 is tubular, with a slit 107 through which electrons emerge to form a beam 108. The anode 106 provides acceleration voltage through an external circuit connected by wire 109. The anode 106 readily forms a beam at 50 VDC to 300 VDC, and above, with more voltage providing more acceleration and therefore faster moving electrons. The anode 106 is insulated from the cathode by insulators 110.

A coil 111 is provided to produce a magnetic field. Coil windings are shown, schematically, as many more are needed than shown. The coil produces a field which is a circular magnetic field and circles through the portion of the tube covered by the coil. All coils are wound in the same direction and connected together in one large spiral, or solenoid. The two ends of the coil are brought out as a first coil 112 and a second coil 113 to be connected to an external power supply for power. For this version of the toroid plasma tube, a current in the range of 3 amp to 25 amp causes the beam to spiral in varying orbit diameters. The coil is wound on the outside of the tube, as a convenient method of fabrication, but could reside within the tube as long as the beam has room to spiral. An essential feature of the toroid plasma tube is the center hole 114 which allows the coil to be wound into a toroid. This feature allows the generation of a circular magnetic field. Due to the construction of the tube, the coil is not totally symmetrical, so small auxiliary magnets 115, 116 are placed as required to shape the orbit of the beam path.

FIG. 15 is a cut-away top view of the toroid plasma tube. One additional detail not shown in FIG. 14 is the cathode wire 117 which resides inside the anode assembly. Over the wire 117 is coated a cathode material.

In the cut-away view, the cathode wire 117 is shown as being insulated from the anode 106 by insulators 110. The electron beam spiral is shown in its complete path 118. Coil wires 111 are shown, in a representative number, but not in total numbers as they are too numerous to fully illustrate with clarity. Similarly, the electron beam spiral is shown schematically as many more orbits occur than can be shown. Current direction is shown using standard conventions.

FIG. 16 is a schematic circuit diagram which shows the electrical connections of the toroid plasma tube. A filament supply 121 heats the filament 122. The cathode 123 produces electrons. The anode supply 124 provides an electron accelerating voltage to the anode 125 which accelerates the electrons into a beam. The cathode 123, anode 125, and filament 122 reside within the vacuum tube 126. The coil power supply 127 provides power to the toroid coil 128. The toroid coil produces the circular magnetic fields.

FIG. 17 is a schematic representation of the acceleration plates. The acceleration plates 132, 133 employ known techniques used in vacuum tubes can be readily integrated into all of the embodiments described herein. The electrons accelerate to add energy to the spiral. In FIG. 17, an orbit of the entire toroidal spiral is shown with the indicated direction of rotation. Plate 132 is negative charged and a second plate 133 is positively charged. The two plates 132, 133 set up electric field lines 134. As an electron in orbit passes through the field lines 134 it will be accelerated in the orbital direction. In this way energy can be added to the electrons following the indicated orbit.

The amount of energy stored in the toroid can be calculated using standard laws of physics. Each electron stores energy. In the toroid all electrons have substantially the same velocity and substantially the same energy. Total energy stored is therefore the product of the total number of electrons and the energy per electron.

Initial prototypes used low energy electrons at 50 to 150 electron-volts (eV). Electrons can be accelerated to approximately 25,000 eV, without significant synchrotron radiation losses, and much higher where losses can be tolerated. Total number of electrons stored can be great since increasing electron quantity will increase the magnetic restoring force and maintain the balance of forces. Initial prototypes had small total charge. Charge total greater than ten coulombs has been observed. More than that appears possible.

Energy Removal

Energy removal can be done in several ways. The first method utilizes energy removal by collisions. The toroid stores energy. When particles approach the toroid, they are repelled electrostatically, absorbing energy in the process. By valving open the vacuum chamber and allowing increases in the number of particles, energy is removed from the toroid by the collisions. The heated particles can be removed from the vacuum chamber in a controlled manner for use of the heat energy elsewhere.

The geometry of the toroid is such that all the electrons work together to repel air molecules. Collisions with air molecules tend to be elastic, so all electrons remain in orbit during and after a collision. The electrons lose momentum (rotational energy) when repelling an incoming molecule.

As an air molecule approaches the toroid, the module encounters a surface of charge; not individual electrons. Each incoming molecule is electrostatically repelled by the surface charge as an elastic collision. This is possible because of the geometry of the toroid. Each electron in orbit has restoring forces that hold it in place. These forces also transfer energy between electrons. Thus each repulsion of an air molecule takes energy from the toroid as a whole, not from a single electron. The toroid will endure until enough collisions have occurred that there is not sufficient energy to repel colliding molecules. At that time collisions will be inelastic and knock electrons out of orbit, ending the EST.

Energy to repel an air molecule is calculated as follows. An average air molecule has mass equal to $4.8*10^{-26}$ kg. The most probable velocity for an air molecule @ 20° C. is 410 m/s (from "Product and Vacuum Technology Reference Book", Leybold - Heraeus Export, Pa., p.77). The average energy to repel an air molecule (assuming an average approach from 45 degrees) is thus:

$$E = \tfrac{1}{2}(4.8*10^{-26})(410)^2 = 2.02*10^{-21} \qquad (1)$$

Joule/collision

The rate of energy loss of the EST is calculated as follows. The number of collisions per second in air is (from Leybold - Heraeus):

$$ZA*AT \tag{2}$$

where

ZA is the area impingement rate; and

AT is the EST surface area, $$ZA=2.85*10^{20}(P)=\text{collision/second} \tag{3}$$

where P is pressure in millibars.

If pressure is assumed to be a vacuum of $10^{-6}$ mb, for example, energy loss rate of the toroid is:

$$ST*ZA*E=1.06*10^{-2} \text{ Joule/sec.} \tag{4}$$

The energy in an EST with 100 coulombs of charge and 25,000 volts per electron is 250 megajoules. The duration of the EST in a vacuum will thus be approximately $2.5*10^{10}$ seconds.

Energy can be removed from the EST through collisions with a gas. This can be accomplished by controlling the pressure. The rate of energy removed is thus directly proportional to the pressure of the atmosphere around the EST.

A second method discharges all or parts of the electrons in the toroid by altering the magnetic field. By introducing a magnetic field near the toroid, the magnetic field of the toroid will be overcome at one point. This causes electrons to shoot out in one beam and hit a target. FIG. 18 is a schematic illustration of a system for removing charge from the toroid. A typical orbit is shown schematically as 140. A local electromagnet is shown as 142. This electromagnet 142 can be operated to create a local field great enough to overcome the magnetic field of the toroid. When this condition exists, electrons form a beam tangentially to the orbit as shown by 144. They will collide with the target 146, and in doing so transfers their energy. The length of duration of the local magnetic field determines how many electrons are diverted.

A third method for removing the energy is through magnetic induction. The electrons in the toroid will travel in a fixed orbit. FIG. 19 is a schematic illustration of a system for removing charge by magnetic induction. As shown, placing a magnetic pick up 150 near the orbit will cause an induced voltage in the pick-up as the pick-up senses electrons passing 152. A magnetic pickup is a well-known device such as a coil or a wire which will cut magnetic field lines and cause a voltage to be created on the wires of the coil or on a single wire. The pick-up functions as does a stator in an electric generator to produce voltage and current induced by the electrons.

A fourth method disclosed for removing energy is through thermal electric generation. The toroid location can be altered by external fields. Using external magnetic and electric fields, the toroid can be moved closer to a surface, causing heating of the surface. Existing technology can be used to generate electricity from the heated surface.

A fifth method for removing energy is through magnetic field rotation. FIGS. 20A and 20B illustrate perspective and side views respectively, for removing energy by magnetic field rotation. The toroid is a sheet current and the current is also spiraling and therefore creates a magnetic field normal to the toroid as shown by 160 in FIG. 20A. A conductor 162 cuts field lines as shown in FIG. 20B and creates induced voltage when the conductor is rotated through the magnetic field, or when the toroid itself is rotated.

A sixth method for removing energy is through a reversal of the field on the accelerating plates. As electrons are slowed down, they create a reactive voltage which can be used as a power source.

Control of the initiation and maintenance is done as shown in FIG. 21, which schematically illustrates a control system 170 to be used with the present energy storage system. A controller 171 sets the power supply voltages for the initiation of the toroid as described above with reference to FIG. 16. The initiating coil power supply 127 is turned on, then the filament voltage supply 121, then the grid voltage supply 124 incrementally to initiate the toroid. When the toroid is ready to self-sustain, the controller 171 turns off these supplies as required. Auxiliary fields 115 and 116 are used as required to establish the magnetic field.

Energy is added using plates 132 and 133. A toroid sensor 175 senses the presence of the particles. This is done with a separate sensing coil. Energy removal circuits 176 are actuated as needed. A display computer 177 provides the operator with instructions, status, and manual control options.

Electrons are sourced in many ways. The electron gun is a well-known approach and is shown in FIG. 14. In addition, a multiplicity of guns or sources can be used for the purpose increasing the amount of electrons initially injected to initiate the toroid. This is shown in FIG. 22A. Each gun has the elements and function shown in FIGS. 14 and 15. FIG. 22A shows many guns, 181, each injecting electrons. Initiating coils are not shown for clarity, but would be analogous to FIGS. 14 and 15.

Another source of electrons can be a continuous filament or series of filaments extending completely around the vacuum chamber. FIG. 22A schematically illustrates a vacuum chamber with a plurality of electron sources arrayed symmetrically about the chamber. A continuous filament wire, 183, can also be used and is shown in the top cross-sectional view of FIG. 22B attached to one surface of the chamber, inside the coils (initiating coils not shown, for clarity). When power is applied to the filament leads 184 electrons are generated along the length of the filament. An electron shield 185 is supplied, as shown in FIG. 22C, which is appropriately biased to direct the electrons toward the grid 186. The grid accelerates the electrons which curve along the path 187 when the magnetic field is applied as described previously.

FIG. 23 illustrates a system 190 for removing energy from a vacuum tube system 100' using a gas flow system. This system 190 can be controlled by the energy removal function of the control system shown in FIG. 17. A gas supply 191 is attached to the vacuum housing 101' via piping 192 with an inlet valve 193. Opening the inlet valve 193 and controlling the rate of gas flow injects gas into the housing 101'. The gas will cause elastic collisions with the toroid and gain heat. Hot gas 194 will exit an outlet 195 having an outlet valve 196 similar to the inlet valve 193. Normal precautions need be taken to provide for pressure safety relief (not shown here). The electron plasma toroid will lose energy as it repels gases. Gases used would normally be inert.

Initiating and Containing

FIG. 24 illustrates an electrode and single turn coil for initiating and containing an electron spiral toroid. To achieve a high energy version of the toroid, a high energy electron beam source is needed. A high energy electrode consists of an electrode wire 231 connected to two terminals 232 via larger wires 233. The electrodes are each in turn connected to a high current supply by suitable wires with connectors 234. The electrodes are mounted to a frame 235 consisting of a base and individual supports for t he electrodes. The supports are insulated with tubing 236. Very fine wire 237 is soldered to the electrode wire across the gap.

When a high current supply with high voltage is connected to the electrode, the thin wire vaporizes quickly, heating the ends of the electrode wires, which in turn erode completely to the ends where they connect to the larger wire at the electrodes. The electrons continue to flow through the gap from one electrode to the other after the electrode wire has eroded.

The details of the construction are as follows: the very thin wire is on the order of AWG 38. The electrode wire is AWG 22, although various sizes from AWG 24 to AWG 18 have been used. The larger wire at the electrode is AWG 10, to prevent excessive heating. At each wire interconnection, solder is applied to ensure good bonding. The electrodes are solderless lugs, with mechanical holding hardware. Insulation used is teflon tubing.

If the electrodes are used without an initiating coil, free toroids can be generated. The toroids are "free" in the sense that they are not captured by a coil. By firing the electrode with typically 170 VDC, at a pressure of typically 10 mb (0.01 atm), free toroids will result. These have been observed to occur when the electrode has finished eroding, and the electron beam is in the process of extinguishing itself.

The toroids have been initiated at pressure ranging from 0.01 mb ($10^{-5}$ atm) to 100 mb (0.1 atm). Toroids have been initiated at voltages from 80 VDC to over 500 VDC. Toroids have been initiated with currents measured from 200 amperes to 1300 amperes. The toroids observed are measured to be approximately 5 millimeters in diameter, with an orbit diameter of 1.5 millimeters. The toroids are similar to the general shape shown in the toroid figure, and are a smooth surface.

The electrode is used in conjunction with a coil, or loop, 238. Once the electrode has been connected for a time long enough to establish a beam in the gap, the coil is turned on, creating a magnetic field which causes the electron beam to spiral around the wire. With the coil remaining on, the beam forms the toroid 239. The coil remains on, which contains the toroid. Once the toroid forms, the electrode can be turned off.

Timing of the initiation cycle is important. The electrode wire has to be given enough time to erode fully, and to establish a plasma. This takes approximately 60 milliseconds. The coil then can be turned on.

Also important is the field strength of the coil. If the field strength is too great, it will "blow out" the electrode, a well-known phenomenon associated with magnetic blow outs on mechanical relays. If the coil is not strong enough, the beam will continue without spiraling. Typically, the electrode can be initiated at 175 VDC, and 750 Amperes. The coil needs 750 Amperes at a distance of one inch. Pressure can vary, but typically starts at less than 100 mb (0.1 atm), and more normally is between 1 and 10 mb (0.001–0.01 atm).

When electrons are used, the toroid orbit is a configuration of electrons in orbit. The total charge accumulation can be a problem for containment of the toroid. One apparatus to overcome this is a central charge accumulator for neutralizing the charge of the toroid, shown in FIG. 25. To an outside observer, the charge of the toroid appears to be all residing at the center of the toroid. Theoretically, a total charge of opposite sign located at the toroid center will neutralize the toroid charge. If ions equal to the number of electrons are located at the center of the toroid, the charge will be neutralized, allowing containment of the toroid.

The charge cannot practically be accumulated as a point charge. However, it can be located in a charge accumulator as long as the charge accumulator is symmetrical to the toroid. The location of the charge accumulator 241 must be such that its center is located at the center $C_T$ of the toroid 242. Locating it central to the toroid is not difficult, because the charge of the toroid itself will seek to minimize forces and will thus seek to centralize itself on the charge accumulator. The charge accumulator can be in any number of shapes, including but not limited to a sphere, a cylinder, a disc, or any complex shape that is symmetrical about the central axis. The dimensions need to be less than that of the central opening of the toroid.

When electrons are used, the toroid is a collection of orbiting electrons. An electron will absorb a photon directly, and in doing so, the energy level of the electron will be raised. FIGS. 26A–26C illustrate a charger for adding energy to a toroid. Schematically shown is a single orbit 251 of electrons 252. The direction of rotation is as shown. If a photon 253 is caused to impact on an electron in the direction of the electron motion, then the energy of the photon will be absorbed by the electron, increasing the velocity of the electron in the direction of rotation.

With this method of energy addition, photons from any source can be used to add energy to the toroid. Sources of energy include but are not limited to solar energy, lasers, and direct light. Care must be taken to add photons in the direction of rotation, or the electrons will be slowed. An appropriate shield 254 can be used to prevent light from impacting the electrons in the wrong part of the orbit.

Electrical Power Generators

Once a toroid is established, and energy is stored in it, the toroid can be used in conjunction with a thermalelectric generator or thermalchemical generator. The physics of these devices is well known, and will not be detailed here. An example of a thermalelectric device is a flat plate thermopile from Global Thermoelectric Company. An example of a thermalchemical generator is an AMTEC cell from Advanced Modular Power Systems, Inc. which uses a liquid Sodium cycle to generate electricity.

Each of these generators requires a heat source. The requisite heat can be generated from the electron spiral toroid. Using the hot gas generator described in FIG. 23, heated gas can be applied directly to the thermalelectric or thermalchemical device to generate electricity.

The energy stored in the toroid can also be used in conjunction with a magnetohydrodynamic (MHD) system to generate electricity. The MHD technology is well known, but not used in portable applications due to a lack of a portable high energy power source. The plasma toroid can provide this portable power source.

References which explain the MHD system are "Magnetohydrodynamic Energy for Electric Power Generation" by Robert F. Grundy, and McGray Hill's "Engineering Magnetohydrodynamics," by George Sutton. MHD systems are in wide use throughout the world. MHD systems are compact, simple, and have a high power density, which make it very attractive for portable applications. A complete MHD system design is not provided here, because the references provide that information. But every MHD system needs a high temperature heat source, and a heat source for the MHD system is described.

FIG. 27 illustrates schematically an MHD system for converting energy from the toroid into electrical energy. A plasma toroid is contained in a housing 261 with a controlled atmosphere. The atmosphere is controlled by a gas supply shown schematically as 267. The gas is heated by the toroid, similar to the energy removal described above and illustrated in FIG. 23. By controlling the pressure and temperature in the housing, energy is removed from the toroid as required. The equations for the rate of removal are detailed above in the energy removal section. The gas used here is carbon dioxide or similar gas which can be heated to 3000K and above without ionizing. Ionizing needs to be avoided to ensure long life for the toroid.

For an MHD system, it is necessary to generate an ionized MHD gas 263. This can be done by using Nitrogen or Hydrogen or any of a number of similar gases and seeding it with an alkali metal such as Potassium to ensure ionization at a relatively low temperature of 2500K. To generate the MHD gas, the gas from the toroid housing is moved by a pump or similar mechanism through a heat exchanger 262 to heat the MHD gas. In this way, the MHD gas is heated and ionized, but the toroid housing gas remains non-ionized. The heat exchanger is well-known technology used in high temperature heat exchangers, and not detailed herein. The high temperatures are accommodated by building the heat exchanger of a heat tolerant metal such as titanium.

The MHD gas passes through an MHD magnetic field 264, which can be generated by permanent magnets (not shown). The movement of the ionized gas through the magnetic field causes the ions and electrons to move to the opposite electrodes, thus generating electricity at MHD electrodes 265. The MHD gas is moved through a radiator 268 to cool the MHD gas, then through the heat exchanger to repeat the cycle. The MHD gas is mover by a pump 266 or nozzle assembly.

Equivalents

The preceding description is particular to the preferred embodiments and may be changed or modified without substantially changing the nature of the invention. While the invention has been particularly shown and described with reference to preferred embodiments thereof, it will be understood by those skilled in the art that various changes in form and details may be made therein without departing from the spirit and scope of the invention as defined by the appended claims.

The invention claimed is:

1. A manufacture comprising a plurality of electrons circulating along a path having a hollow symmetrical shape defined by a surface of a toroid, the hollow symmetrical shape surrounding a hollow interior having a circular axis extending around a central axis of the toroid.

2. The manufacture of claim 1 wherein the shape is defined by a controllable magnetic field.

3. The manufacture of claim 1 wherein the electrons are contained in the path over time.

4. The manufacture of claim 3 wherein the electrons are contained at least by an electromagnetic field.

5. The manufacture of claim 3 wherein the electrons are contained at least by interacting forces between the individual electrons.

6. The manufacture of claim 1 wherein the electrons circulate within a vacuum.

7. The manufacture of claim 6 wherein the vacuum is controllable by a user.

8. A method of arranging electrons into a defined shape, comprising the steps of:
defining a surface of a toroid, the toroid having a first axis and a second circular axis surrounding the first axis; and
circulating a plurality of electrons along a path having a hollow symmetrical shape extending around the second circular axis and bounded by the defined surface.

9. The method of claim 8 further comprising the step of containing the electrons in the shape over time.

10. The method of claim 9 wherein the step of containing comprises exposing the electrons to an electromagnetic field.

11. The method of claim 9 wherein the step of containing comprises inducing an interaction between the individual electrons.

12. The method of claim 8 wherein the step of defining comprises establishing a controllable magnetic field.

13. The method of claim 8 further comprising, before the step of circulating, the step of establishing a vacuum and wherein the electrons circulate within the vacuum.

14. The method of claim 13 wherein the vacuum is controllable by a user.

15. A manufacture comprising a plurality of electrons spirally circulating along a contained path in a controllable vacuum, the path having a hollow symmetrical shape surrounding a circular axis defined by a surface of a toroid, the circular axis extending around a central axis of the toroid.

16. The manufacture of claim 15 wherein the shape is defined by a controllable magnetic field.

17. The manufacture of claim 15 wherein the electrons are contained at least by ions in the vacuum.

18. The manufacture of claim 15 wherein the electrons are contained at least by an external magnetic field.

19. The manufacture of claim 15 wherein the electrons are contained at least by an external electric field.

20. The manufacture of claim 15 wherein the electrons are contained at least by interacting forces between the individual electrons.

21. A manufacture comprising a plurality of like-charged particles circulating along a path defining a symmetrical shape.

22. The manufacture of claim 21 wherein the shape is defined by a controllable magnetic field.

23. The manufacture of claim 21 wherein the like-charged particles are contained in the path over time.

24. The manufacture of claim 23 wherein the like-charged particles are contained in the path at least by an electromagnetic field.

25. The manufacture of claim 23 wherein the like-charged particles are contained in the path at least by interacting forces between the individual electrons.

26. The manufacture of claim 21 wherein the like-charged particles circulate within a vacuum.

27. The manufacture of claim 26 wherein the vacuum is controllable by a user.

28. The manufacture of claim 21 wherein the like-charged particles are electrons.

29. A method of arranging like-charged particles into a defined shape, comprising the steps of:
circulating a plurality of like-charged particles along a path defining a symmetrical shape, the symmetrical shape surrounding a first axis that extends around a second orthogonal axis.

30. The method of claim 29 further comprising the step of containing the like-charged particles in the shape over time.

31. The method of claim 30 wherein the step of containing comprises exposing the like-charged particles to an electromagnetic field.

32. The method of claim 30 wherein the step of containing comprises inducing an interaction between the individual like-charged particles.

33. The method of claim 29 wherein the step of defining comprises establishing a controllable magnetic field.

34. The method of claim 29 further comprising, before the step of circulating, the step of establishing a vacuum and wherein the like-charged particles circulate within the vacuum.

35. The method of claim 34 wherein the vacuum is controllable by a user.

36. The method of claim 29 wherein the like-charged particles are electrons.

37. A manufacture comprising a plurality of like-charged first particles spirally circulating along a contained path in a controllable vacuum, the path defining a symmetrical shape.

38. The manufacture of claim 37 wherein the shape is defined by a controllable magnetic field.

39. The manufacture of claim 37 wherein the first particles are contained in the vacuum at least by a plurality of second particles, the second particles having a charge opposite to the charge of the first particles.

40. The manufacture of claim 37 wherein the first particles are contained at least by an external magnetic field.

41. The manufacture of claim 37 wherein the first particles are contained at least by an external electric field.

42. The manufacture of claim 37 wherein the first particles are contained at least by interacting forces between the individual first particles.

43. The manufacture of claim 37 wherein the first particles are electrons.

* * * * *